June 6, 1950          J. E. HANSEN                2,510,398
              EYEGLASS FRAME CONSTRUCTION
                   Filed Jan. 17, 1947
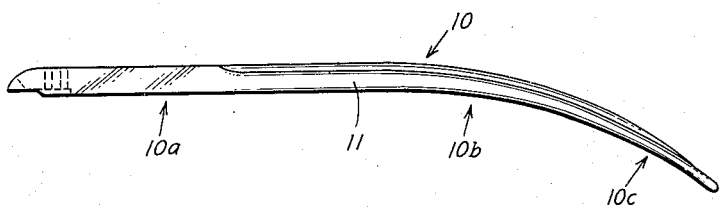
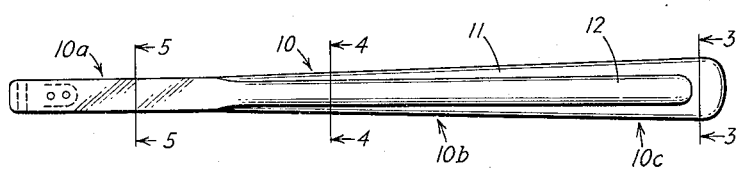
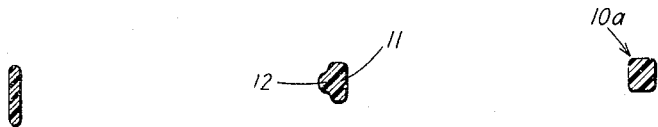
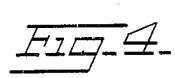
INVENTOR
Julius E. Hansen
BY
Blair, Curtis & Hayward
Attorneys Patented June 6, 1950

2,510,398

UNITED STATES PATENT OFFICE 2,510,398

EYEGLASS FRAME CONSTRUCTION

Julius E. Hansen, Providence, R. I., assignor to Bay State Optical Company, Attleboro, Mass., a corporation of Maine Application January 17, 1947, Serial No. 722,681

1 Claim. (Cl. 88—52)

This invention relates to non-metallic eyeglass frame construction and most particularly to the temple of a non-metallic eyeglass frame.

One of the objects of this invention is to provide a non-metallic temple for an eyeglass frame which is simple, practical and thoroughly durable. Another object is to provide a non-metallic temple of the above character which is neat and attractive in appearance. Another object is to provide a temple of the above character which is inexpensive to manufacture both from a standpoint of labor and materials used. Another object is to provide a non-metallic temple which will be sturdy and well able to withstand hard usage. A further object is to provide a non-metallic temple of the above character which may be used as either the right or left-hand temple of a frame. A still further object is to provide a temple of the above character which eliminates the necessity of providing the temple with a metal reinforcing rod while at the same time has strength equivalent to a temple provided with a reinforcing rod. Other objects will be in part obvious and in part pointed out hereinafter.

The invention accordingly consists in the features of construction, combinations of elements and parts, all as will be illustratively described herein, the scope of the application being indicated in the following claim.

Figure 1 is a top plan view of my non-metallic temple;

Figure 2 is a side elevation of the temple shown in Figure 1;

Figure 3 is a vertical section taken on the line 3—3 of Figure 2;

Figure 4 is a vertical section taken on the line 4—4 of Figure 2; and,

Figure 5 is a vertical section taken on the line 5—5 of Figure 2.

Similar reference characters refer to similar parts throughout the several views of the drawing.

It might here be noted that any reference hereinafter to a "rearward" direction refers to a direction toward the face of the wearer when the temple is connected to an eyeglass frame whereas the term "forward" denotes the opposite direction. An "outward" direction signifies a direction outwardly from the side of the head of the wearer of a frame, while the term "inward" denotes a direction opposite thereto.

As conducive to a clearer understanding of certain features of this invention, it might here be pointed out that there are certain objections to the better quality non-metallic temples now in use. For many years, to give non-metallic temples of light construction structural strength and to make non-metallic temples which will hold their shape, non-metallic temples have been provided with metal reinforcing rods. These rods are objectionable first because the manufacture of a non-metallic temple having a reinforcing rod therein is expensive both from the standpoint of labor and materials used. In manufacturing such a temple the rod is first inserted in the non-metallic stock by special machinery. Next, each temple must be machined, ground, and then polished. During these operations extreme care must be used to insure that the right amount of stock is removed from each temple, so that its reinforcing rod is centrally positioned therein. Each of the above steps is expensive. If the non-metallic material in a temple is transparent, the rod detracts from the appearance of the temple as the rod is visible through the plastic material. Furthermore, the size of the rod is magnified by the curved surface of the non-metallic material which acts as a magnifying lens, which further detracts from the appearance of a temple. Thus there are major objections to using reinforcing rods in temples, and it is accordingly another object of this invention to provide a non-metallic temple of light construction which will hold its shape and be structurally strong without requiring the use of a reinforcing rod.

Referring now to the drawing, the temple generally indicated at 10, is preferably made from a suitable plastic material by injection molding. The body of temple includes a relatively rigid portion, generally indicated at 10a, a resilient portion generally indicated at 10b and an inwardly curved, flexible portion generally indicated at 10c. Portion 10a of the temple, which includes the end which is connected to the end piece of a non-metallic eyeglass frame, is fairly thick in cross portion Figure 5. Because of the thickness of this portion a strong connection may be made between the temple and the metal hinge plate which hingedly connects the temple to the frame. In addition to forming a strong support for the hinge connection this portion of the temple also acts as the base portion on which the temple is built, adding to its structural strength.

The resilient center portion 10b of temple 10 includes a body section 11 which is of considerably less thickness than portion 10a of the temple. Section 11 is of reduced thickness to give portion 10b of the temple resiliency. To give portion 10b of the temple structural strength and to insure that the temple holds its shape under condition of extended hard usage, a rib 12 is provided on the outside of the temple. This rib is formed as an integral part of the temple and section 11 tapers upwardly at its forward end to portion 10a. A further important accomplishment of the provision of rib 12 is that it gives the temple the necessary structural strength without materially adding to the temple's weight.

Portion 10c of the temple is of still less width than portion 10b and curves inwardly (Figure 1). The rear portion of the temple gradually decreases in thickness from its forward end to its rear end. This further reduction in thickness makes the rear end of the temple flexible and this, taken in combination with the shape of this portion of the temple, insures that the temples properly hold the frame in correct position upon the wearer. The flexing of portion 10c of the temple also of material importance in that it affords physical comfort to any wearer, in that portion 10c flexes to conform itself to any shape of skull. It will be noted that rib 12 gradually tapers in thickness toward the rear end of the temple and finally blends completely into it. This ensures that the rear end of the temple holds its shape but does not materially interfere with the flexing of this portion of the temple.

Thus it will be seen that a non-metallic temple of light construction has been described which is inexpensive to manufacture as it does not include a reinforcing rod. Furthermore, this temple because of its construction has structural strength and will not lose its shape. Also this temple is one which is constructed so that it correctly holds a frame upon the wearer while affording the wearer a maximum of comfort. Accordingly a practical and efficient temple has been disclosed in which the several objects hereinabove mentioned as well as many others are successfully accomplished.

As many possible embodiments may be made of the mechanical features of the above invention, and as many changes might be made in the embodiment above set forth, it is to be understood that all matter hereinbefore set forth, or shown in the accompanying drawing, is to be interpreted as illustrative and not in a limiting sense.

I claim:

In a non-metallic temple for an eyeglass frame, in combination, a non-metallic body member longitudinally composed of three integral portions, a forward portion, a center portion and a rear portion, the forward portion of said body member being rigid and of slightly less thickness than width and of substantially uniform dimensions in cross sections throughout its length, the center portion being of substantially less thickness than said forward portion, said center portion decreasing in thickness and increasing in width from its forward to its rear end, the rear portion of said body member increasing in width and decreasing in thickness throughout its length from its forward to its rear end, the increases in width and decreases in thickness in said center and rear portions being gradual and blending into each other, and an integral rib centrally positioned on the outside of said center and rear portions, said rib extending longitudinally of said center and rear portions and its forward end joining the rear end of the forward portion of said body member, said rib being of substantially less width than the width of the center and rear portions of said body member, said rib gradually decreasing in thickness from its forward to its rear end where it blends into the outer surface of the rear portion of said temple at a point spaced from the rear end of the rear portion of said body member, the outer surface of said rib curving outwardly away from the outer surface of said body member and said rib's longitudinal edges blending into the outer surface of the center and rear portions of said body member.

JULIUS E. HANSEN.

REFERENCES CITED

The following references are of record in the file of this patent:

UNITED STATES PATENTS

| Number | Name | Date |
|---|---|---|
| D. 90,354 | Bouchard | July 25, 1933 |
| D. 107,337 | Hodny | Dec. 7, 1937 |
| D. 120,885 | Galler | June 4, 1940 |
| D. 121,563 | Bressler | July 23, 1940 |
| 1,564,899 | Schumacher | Dec. 8, 1925 |
| 1,618,475 | Read | Feb. 22, 1927 |
| 1,645,658 | Nerney | Oct. 18, 1927 |
| 1,813,148 | Cozzens | July 7, 1931 |
| 2,040,245 | Crawford | May 12, 1936 |